(12) United States Patent
Romas et al.

(10) Patent No.: US 7,510,311 B2
(45) Date of Patent: Mar. 31, 2009

(54) EXTERIOR REARVIEW MIRROR FOR VEHICLES, IN PARTICULAR MOTOR VEHICLES

(76) Inventors: Vasile Romas, Weiherstr. 23, 73730 Esslingen (DE); Ovidiu Catalin Susca, Azutului 1 bi 28, 5975 Vatra Dornei (RO)

( * ) Notice: Subject to any disclaimer, the term of this patent is extended or adjusted under 35 U.S.C. 154(b) by 217 days.

(21) Appl. No.: 11/130,998

(22) Filed: May 17, 2005
(Under 37 CFR 1.47)

(65) Prior Publication Data
US 2005/0276058 A1 Dec. 15, 2005

(30) Foreign Application Priority Data
May 17, 2004 (DE) ........................ 10 2004 025 385

(51) Int. Cl.
*B60Q 1/26* (2006.01)
*B60R 1/12* (2006.01)
*F21V 9/00* (2006.01)

(52) U.S. Cl. ........................ 362/494; 362/540; 362/545; 362/511

(58) Field of Classification Search ................. 362/459, 362/494, 498, 511, 519, 540, 543, 544, 545, 362/548, 549
See application file for complete search history.

(56) References Cited

U.S. PATENT DOCUMENTS

| 5,017,903 A | * | 5/1991 | Krippelz, Sr. ............... 340/472 |
| 5,587,699 A | * | 12/1996 | Faloon et al. ................ 340/475 |
| 6,264,353 B1 | * | 7/2001 | Caraher et al. .............. 362/494 |
| 6,299,334 B1 | * | 10/2001 | Schwanz et al. ............ 362/511 |
| 6,441,943 B1 | * | 8/2002 | Roberts et al. .............. 359/267 |
| 6,502,970 B1 | * | 1/2003 | Anderson et al. ........... 362/494 |
| 6,657,767 B2 | | 12/2003 | Bonardi |
| 6,761,472 B1 | * | 7/2004 | Cleaver et al. .............. 362/267 |
| 2002/0126497 A1 | | 9/2002 | Pastrick |
| 2003/0179087 A1 | | 9/2003 | Stahel |
| 2005/0281043 A1 | * | 12/2005 | Eisenbraun ................. 362/494 |

FOREIGN PATENT DOCUMENTS

| DE | 296 14 664 U1 | 12/1997 |
| DE | 100 39 760 A1 | 3/2002 |
| DE | 100 58 659 A1 | 5/2002 |
| DE | 202 15 760 U1 | 12/2002 |
| EP | 1 391 755 A | 2/2004 |

* cited by examiner

*Primary Examiner*—Jacob Y Choi

(57) ABSTRACT

An exterior rearview mirror for vehicles, in particular motor vehicles. The exterior rearview mirror has a mirror housing with a mirror glass, which is mounted on a mirror glass support and is encompassed by a frame. The exterior rearview mirror is provided with signal lamps, area lights, and indicator lights that are situated in the mirror housing or in the mirror base. In order to permit a simple, inexpensive installation of a lamp into the exterior rearview mirror so that it does not take up much space, at least one lamp of a built-in light is accommodated in the frame. The lamp, which is fastened to the frame in a non-detachable way, can be accommodated in the frame in a simple, space-saving way and held there securely. The exterior rearview mirror is particularly suited for motor vehicles.

3 Claims, 6 Drawing Sheets

EXTERIOR REARVIEW MIRROR FOR VEHICLES, IN PARTICULAR MOTOR VEHICLES

CROSS-REFERENCE TO RELATED APPLICATION

This application claims priority to German Patent Application No. 10 2004 025 385.4 filed on May 17, 2004.

TECHNICAL FIELD

The present invention relates to an exterior rearview mirror for vehicles, in particular motor vehicles.

BACKGROUND

It is known for signal lamps, area lights, or indicator lights to be provided on the exterior rearview mirror. They are accommodated either in the mirror housing or in the mirror base.

The object of the present invention is to design an exterior rearview mirror of this kind so as to permit a simple, advantageous installation of a lamp that does not require a lot of space.

This object is attained with an exterior rearview mirror of the present invention.

SUMMARY OF INVENTION

In the exterior rearview mirror according to the present invention, the lamp is non-detachably fastened to the frame. It can be accommodated in the frame in an easy, space-saving way and can be held there securely.

Other characteristics of the invention ensue from the remaining claims, the specification, and the drawings.

The present invention will be described in detail below in conjunction with several exemplary embodiments shown in the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE PREFERRED EMBODIMENTS

Figure 1:
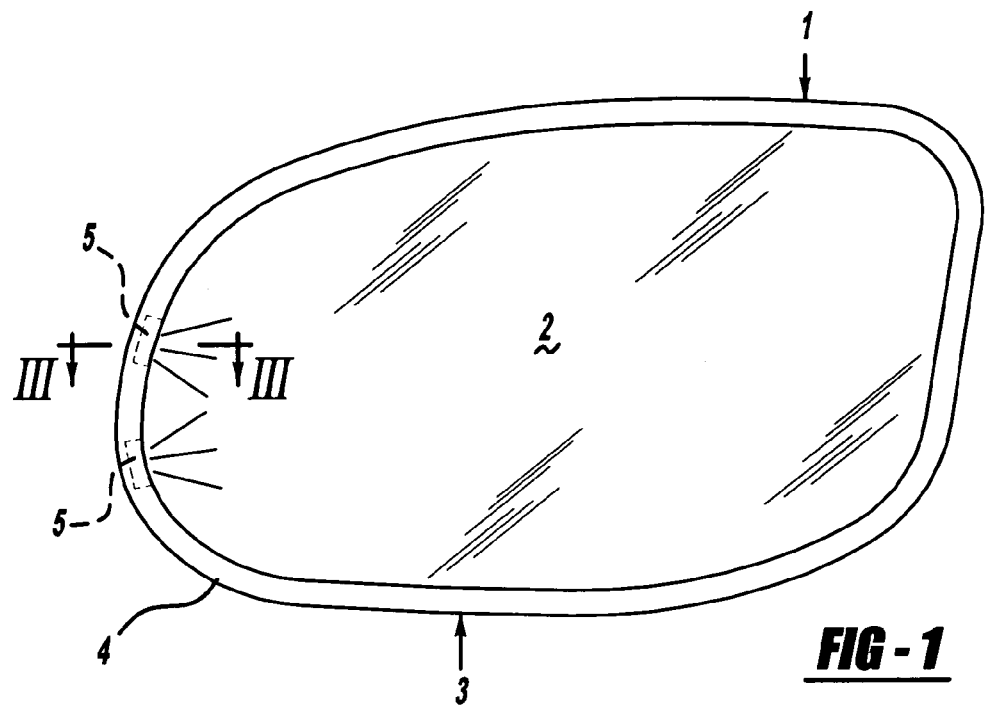
FIG. 1 shows a view of an exterior rearview mirror with a mirror glass that is encompassed by a frame provided with built-in lights.

The external rearview mirror 1 depicted in a simplified form in FIG. 1 is provided for motor vehicles. In a known manner, it has a housing (not shown) that accommodates a mirror glass support (also not shown), which supports a mirror glass embodied in the form of EC glass or normal glass surrounded by a mirror glass frame 3. As also shown in FIG. 1, the mirror glass frame 3 has two built-in lights 5, which are integrated into the surrounding frame and spaced apart from each other in a relatively narrow edge region 4 oriented away from the motor vehicle. The built-in lights 5 can be modular indicator lights, signal lamps, or area lights. The built-in lights 5, which can be the same or different from each other, have one or more lamps 6 (FIG. 3) that can be constituted by LEDs, incandescent bulbs, or the like. They are situated on a printed circuit board 7, which can be embodied in a known fashion as either rigid or in the form of a flexible foil. Electrical/electronic components 8 are situated on the printed circuit board 7. The components 8 and the lamps 6 are placed onto the printed circuit board 7 in a known manner and attached to it.

As will be explained in detail below, the light emitted by the lamp 6 exits by means of at least one light exit surface 9 embodied in the form of a light window above the mirror glass 2 so that the light emitted by the built-in light, when it is used for a display function, is clearly visible to the driver of the vehicle. Since the light 5 is integrated into the mirror glass frame 3, it takes up only a small amount of installation space.

The mirror glass 2 is embodied in the form of a rimless, flat plate and advantageously rests against a mirror glass support plate 10 with the interposition of a heating foil 12. In the exemplary embodiment, the mirror glass support plate 10 is of one piece with the frame 3 and, with an end section 11 that protrudes downward beyond the plane of the plate, adjoins an upward extending frame part 13. In the region below the built-in lights 5, the end section 11 of the support plate 10 is provided with an opening 15 through which a sealing material 16 can be introduced in order to fasten the built-in lights 5 into the frame 3 and protect them from external influences and corrosion. The built-in lights 5 can also be fastened to the mirror glass support plate 10 without sealing material. In that case, the built-in lights 5 can be sealed in a watertight fashion by means of a protective lacquer or the like. It is also possible to seal only the opening 15 or for the seal to be produced in another way. The sealing material 16 offers the advantage of reliably protecting the built-in lights from vibrations and external influences. The built-in lights 5 can also be firmly attached to the mirror glass assembly, for example by means of gluing, detent connection, and the like, so that they are securely attached to the mirror.

The built-in lights 5 are attached by means of their printed circuit board 7 to a step-shaped intermediate section 14 of the support plate 10. The support plate and its end section 11 transition by means of step segments extending up and down essentially at right angles, into a step segment 14' extending parallel to them, which segment has through openings 17 for plug contacts 18 or a cable outlet of the printed circuit board 7. When the light 5 is mounted in place, these plug contacts protrude downward beyond the end section 11 of the support plate 10. In this manner, the current/voltage supply of the components 8 and the lamp 6 of the lights 5 is automatically produced when the plug contacts 18 are plugged into a mated contact (not shown). The lamp 6, which is preferably constituted by at least one LED, is situated on the edge section 25 of the printed circuit board 7 protruding beyond the mirror glass 2. The lamp 6 is supported by contact feet 24, which are spaced slightly apart from the upright frame part 13 and are inserted through openings in the printed circuit board 7 and connected to the board in an electrically conductive manner. The components 8 are spaced a sufficient distance away from the mirror glass support plate 10.

The mirror glass support plate 10 protects the printed circuit board 7, fixes it in position, and covers it in relation to the outside. The electrical/electronic components 8 on the printed circuit board 7 can also be eliminated if they have been provided at another location, for example in a current supply line or in a door control unit or the like of the vehicle.

The frame section 13 that extends in a slight curve upward and toward the mirror glass 2 transitions into a roof-shaped upper frame part 20 under which the lamp or lamps 6 is/are situated. The light window 9, which is delimited by the upper frame part 20 and extends to the mirror glass 2 in the installed position of the light 5, permits the light emitted by the lamp 6 to pass through. The light window 9 is advantageously connected to the upper frame part 20 in a form-locked manner by means of a groove/spring connection 19 and advantageously rests against the mirror glass 2 with its edge for protection against the penetration of dirt, moisture, and the like into the built-in light 5. In this manner, penetration of dirt, moisture and the like is at least to a large extent prevented.

Figure 4:
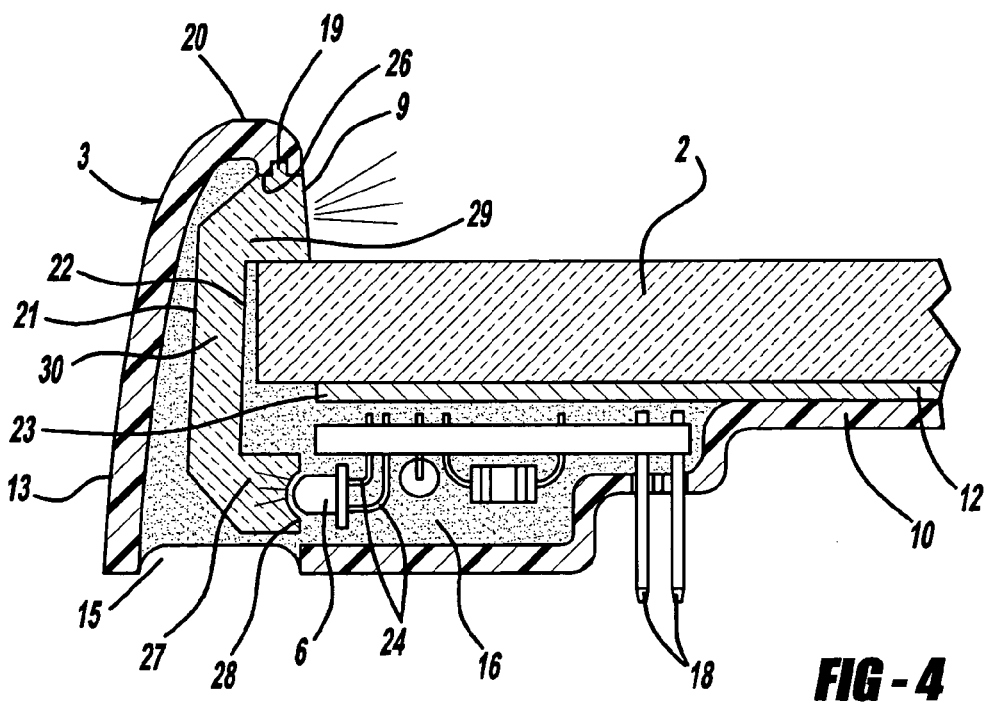
FIG. 4 shows a depiction according to FIG. 3, but with a built-in light of a different design, FIG. 5 through FIG. 7 each show another external rearview mirror according to the present invention in a depiction that corresponds to FIG. 1.

The light exit surface or light window 9 can be transparent and can also be provided with different colors in order to achieve different apparent colors. Instead of the light window 9, it is also possible to provide an optical waveguide 21 (FIG. 4). The light window 9 can also be entirely omitted.

Figure 2:
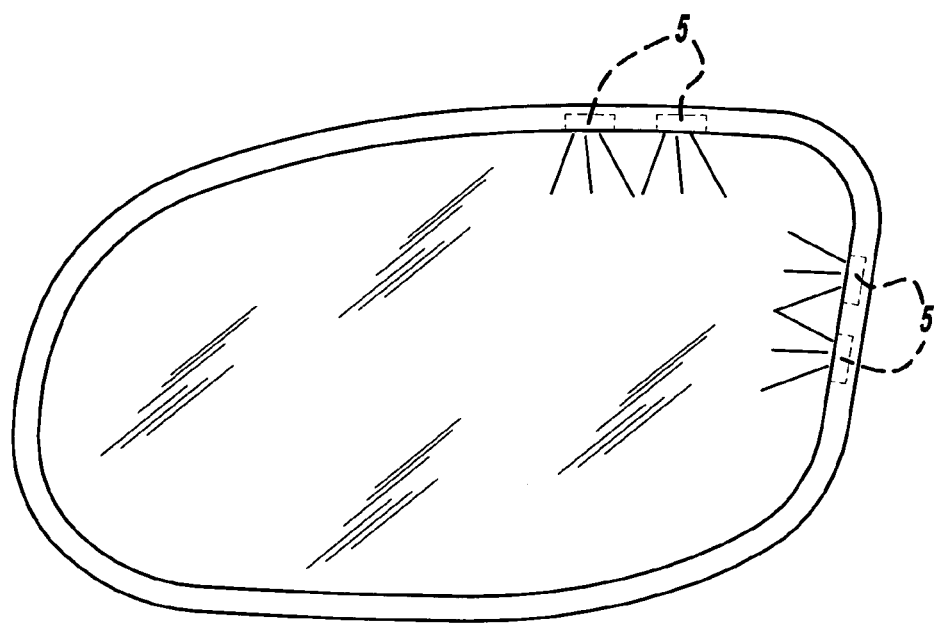
FIG. 2 shows another embodiment form of an exterior rearview mirror according to the present invention, in a depiction that corresponds to FIG. 1.

In the embodiment form according to FIG. 2, the built-in lights provided in the narrow frame part situated the farthest from the vehicle have been omitted. In their place, two built-in lights 5 provided spaced apart from each other are integrated into the frame 3, both in the narrow frame part close to the vehicle and in the frame part at the top in the installed position of the mirror 1. These built-in lights 5 are preferably embodied and situated in the same way as the lights according to FIG. 3 so that they are accommodated snugly in the frame and protected from corrosion and external influences. Naturally, these built-in lights 5 can also be provided in addition to the built-in lights according to FIG. 1 and any number of additional lights can also be provided. The built-in lights 5 can be installed anywhere in the surrounding frame 3, depending on the intended use, for example when used as blind spot indicators, travel direction indicators, area lighting, or the like.

The lamp 6 can be situated behind or in front of a mirrored surface, which is provided, for example, on the optical waveguide 21. The lights 5 can also be situated so that they can function without an optical waveguide or with only a single optical waveguide, as in the embodiment forms according to FIGS. 1 to 3. Each built-in light 5 can be provided with one or more lamps 6 in one or more colors. The lamps 6 can also be shaped so that the optical waveguide 21 (FIG. 4) fits onto them, thus making it unnecessary to install an additional optical waveguide. The arrangement of the lamps can be selected so that the beams of light that they emit extend parallel to or at an angle to the surface of the mirror glass. The frame 3 can be provided with one or more light exit surfaces 9.

Figure 3:
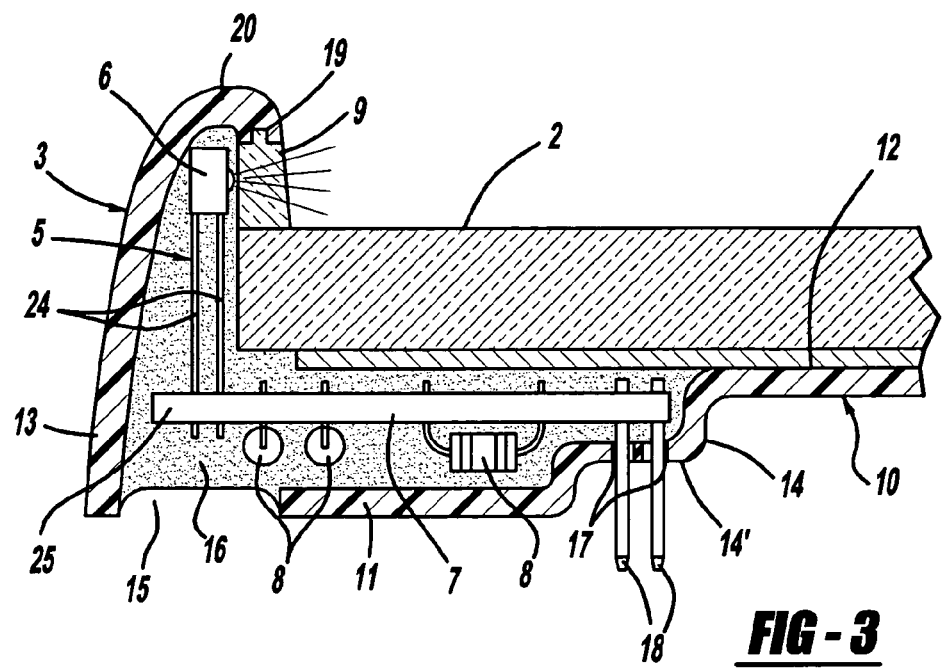
FIG. 3 shows an enlarged section along the line III-III in FIG. 1, through a built-in light of the frame.

The embodiment form according to FIG. 4 essentially differs from the one according to FIG. 3 only in that the lamp 6 is situated under the printed circuit board 7 and the light that it emits is conveyed by the optical waveguide 21 to the region above the mirror glass 2. The end of the optical waveguide 21 situated flush with the free end of the top frame part 20 constitutes the light exit surface 9. As in the preceding embodiment form, the frame 3 is of one piece with the mirror glass support plate 10. By contrast with the preceding embodiment form, the printed circuit board 7 is shorter and does not extend beyond the edge 22 of the mirror glass 2, but only to the outer edge 23 of the heating foil 12. The lamp 6 can once again be constituted by an LED, an incandescent bulb, or the like, that is attached to the printed circuit board 7 with contact feet 24.

The optical waveguide 21 is approximately C-shaped. With its one leg 27 extending approximately parallel to the mirror glass 2, it adjoins the lamp 6, which protrudes into a semicircular recess 28 at one end. This recess constitutes the light entry surface of the optical waveguide 21. The other leg 29 likewise extends essentially parallel to the mirror glass 2 and rests against it with its underside. The end surface of the leg 29 constitutes the light exit surface 9. On its top side, the leg 29 has the spring-like projection of the groove/spring connection 19. The outsides of the legs 27, 29 transition at an angle into the outside surfaces of the crosspiece 30 of the optical waveguide 21. This crosspiece extends approximately perpendicular to the mirror glass 2, between its edge 22 and the frame section 13. The light emitted by the lamp 6 and conveyed in the optical waveguide exits through the flat light exit surface 9 of the optical waveguide 21 extending transversely to the mirror glass 2, and travels toward the driver's side of the vehicle.

Except for the small regions of the light entry and exit surfaces, the optical waveguide 21 is advantageously provided with a reflective surface that prevents stray light losses between the light entry and exit. As in the embodiment form according to FIG. 2, the mirror glass support plate 10 has the opening 15 through which the sealing material 16 can be introduced into the frame 3 in order to seal the built-in lights 5 with the printed circuit board 7 and the components 8.

Figure 5:
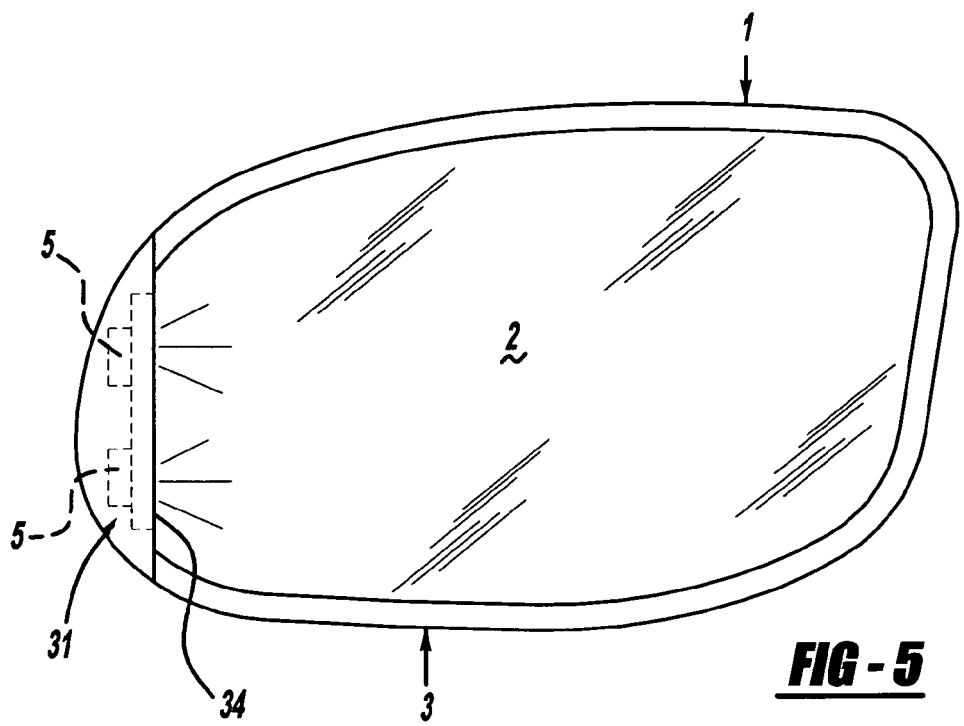
Figure 6:
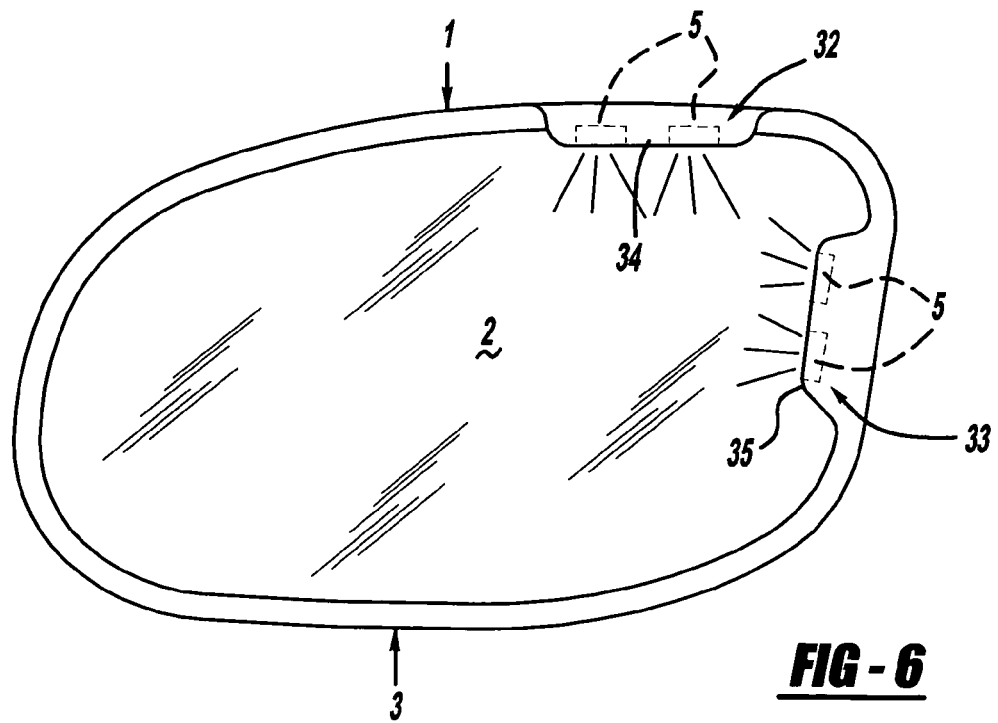

The embodiment forms according to FIGS. 5 and 6 correspond to the one according to FIG. 1, but with the difference that the built-in lights 5 are accommodated in a widened frame part 31 or 32, 33 that protrudes inward over the mirror glass 2 and partially embraces the mirror glass 2—viewed from above.

As in the mirror according to FIGS. 1 and 3, in the embodiment form according to FIG. 5, both lights 5 are situated spaced apart from each other in the narrow frame part that is situated the farthest from the vehicle; a straight light window 9 that extends over both lamps 6 is provided. This light window 9 extends over almost the entire width of the narrow frame part. In the top view according to FIG. 5, the widened frame part 31 is embodied in the form of a segment. Its straight inner edge 34 lies in a plane with the light exit surface of the optical waveguide 21. The light emitted from the light window 9 travels toward the vehicle, approximately parallel to the mirror glass 2.

As in the embodiment form according to FIG. 2, in the embodiment form according to FIG. 6, the pairs of built-in lights 5 are provided in the narrow frame part closest to the vehicle and in the longitudinal frame part at the top in the installed position of the mirror 1. By contrast with the embodiment form according to FIG. 2, the lights 5 protrude inward over the mirror glass 2 so that the emitted light travels further downward and further outward away from the vehicle.

The widened parts 32, 33 are approximately trapezoidal when viewed from above; they taper slightly as they extend inward from the edge of the mirror glass 2. The light exit surfaces of the lights 5 are once again situated flush with the inner edge 34, 35 of the widened parts 32, 33 of the frame 3. The widened frame parts 31 to 33 are of one piece with the frame 3 and constitute uninterrupted extensions of the outside of the frame. Their respective longitudinal edges 34, 36 oriented toward the mirror glass 2 extend beyond the inner edge 3' of the frame 3.

As in the embodiment form according to FIG. 3 or 4, all of the lights 5 or only part of them can be provided with a light window or an optical waveguide.

Instead of the continuous light window according to FIG. 5, it is also possible to provide two light windows. Naturally, in the embodiment forms according to FIGS. 5 and 6 it is also possible to provide any number of additional lights 5 or to provide the lights at any other locations on the frame 3, in the frame itself or in corresponding widened frame parts, for example when a turn signal or an area light is to be provided. In the embodiment forms described above, the light is emitted parallel to the surface of the mirror glass 2.

Figure 7:
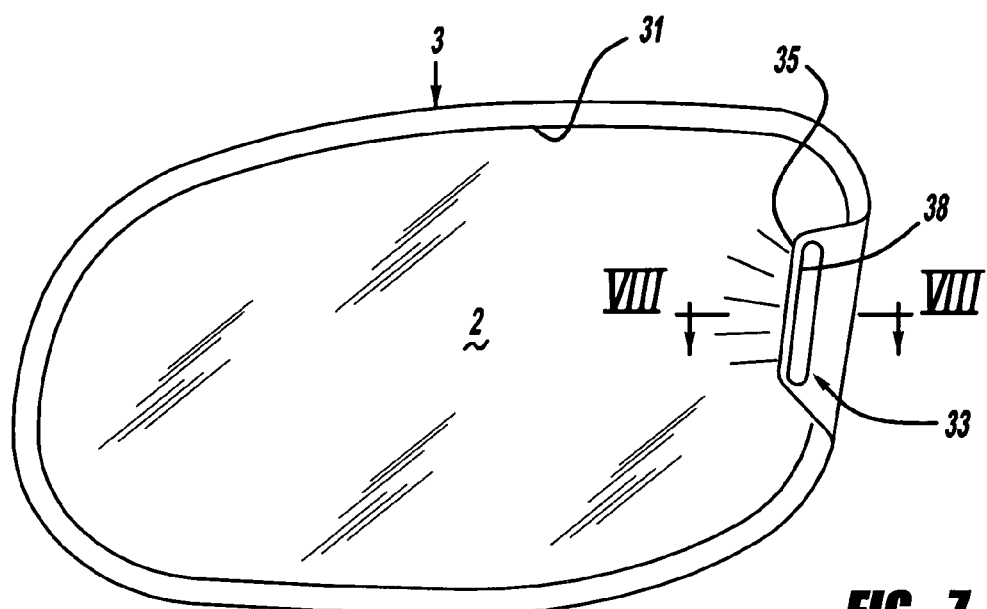
Figure 8:
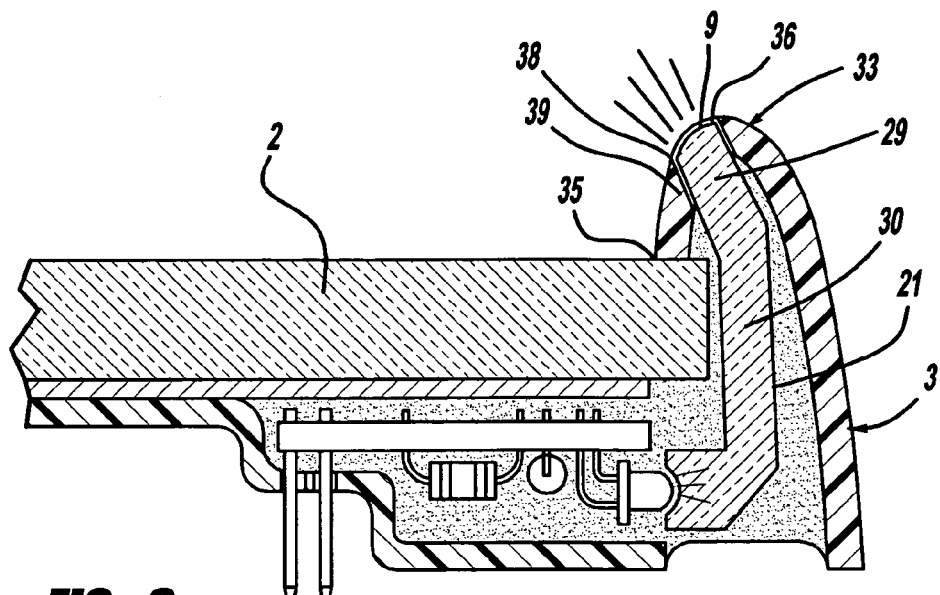
FIG. 8 shows a section along the line VIII-VIII in FIG. 7.

The embodiment form according to FIGS. 7 and 8 differs from the one according to FIG. 6 in that only the one widened frame part 33 close to the vehicle is provided. On its surface oriented away from the mirror glass 2, it has a slot-shaped opening 36. This opening extends parallel to the longitudinal edge 36 of the widened part 33, spaced slightly apart from it. Otherwise, the widened part 33 is essentially the same as the one according to FIG. 6. Naturally, other widened parts can also be provided.

As is clear from FIG. 8, the end of the upper leg 29 of the optical waveguide 21 constituting the light exit surface 9 protrudes into the opening 36. The optical waveguide 21 is embodied essentially the same as the one according to FIG. 4. The leg 29, however, does not extend parallel to the mirror glass 2, but instead extends at an obtuse angle in relation to it and to the crosspiece 30 of the optical waveguide so that light exiting from the opening 36 travels obliquely upward away from the mirror glass 2. This embodiment is particularly suitable e.g. for turn signals with a legally prescribed angle of departure intended to prevent the driver of the vehicle from looking into the emitted light and being blinded by it.

As is clear from FIG. 8, the frame part 39 that has the inner longitudinal edge 35 of the widened frame part 33 and the inner longitudinal edge 38 of the opening 36 can be constituted by a separate part that is attached to the mirror glass 2 and/or to the frame 3.

Figure 9:
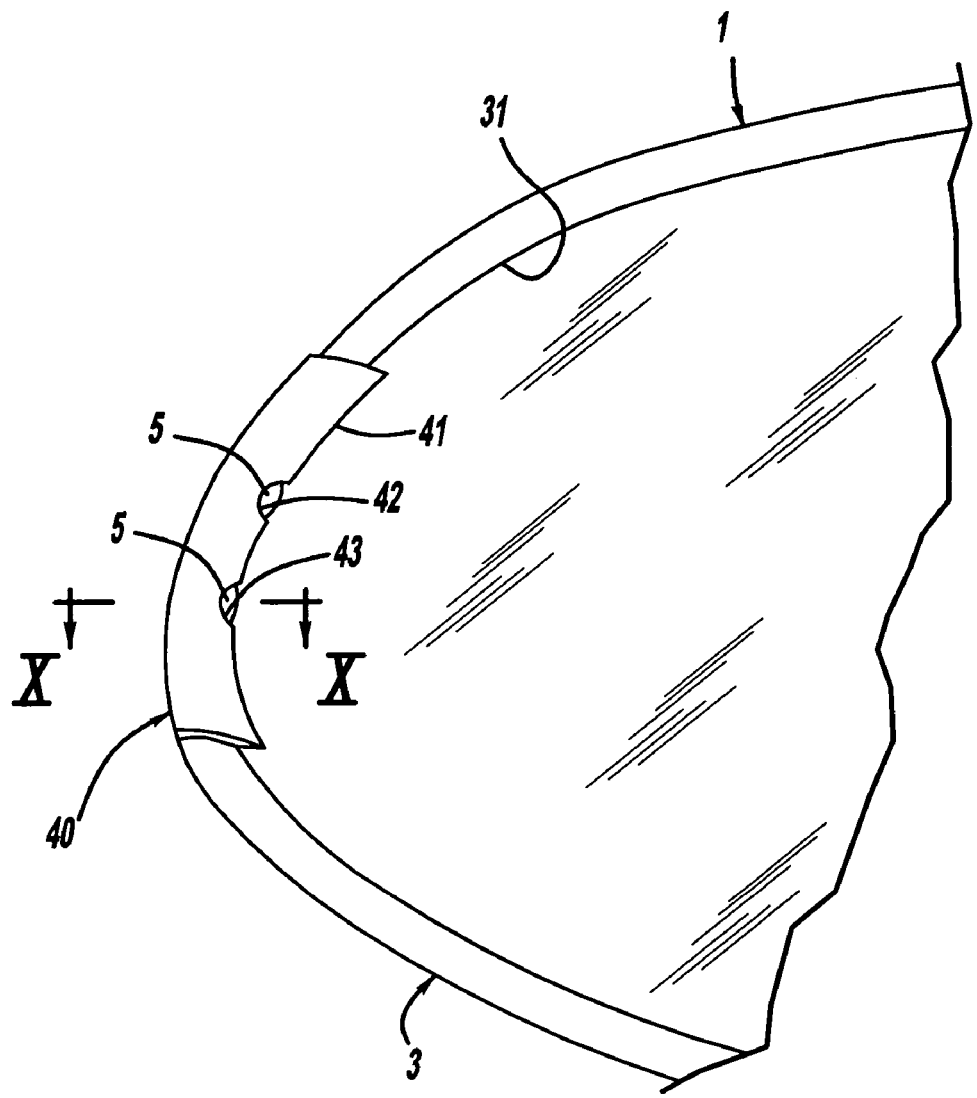
FIG. 9 shows a part of another exterior rearview mirror according to the present invention in a depiction that corresponds to FIG. 1.
Figure 10:
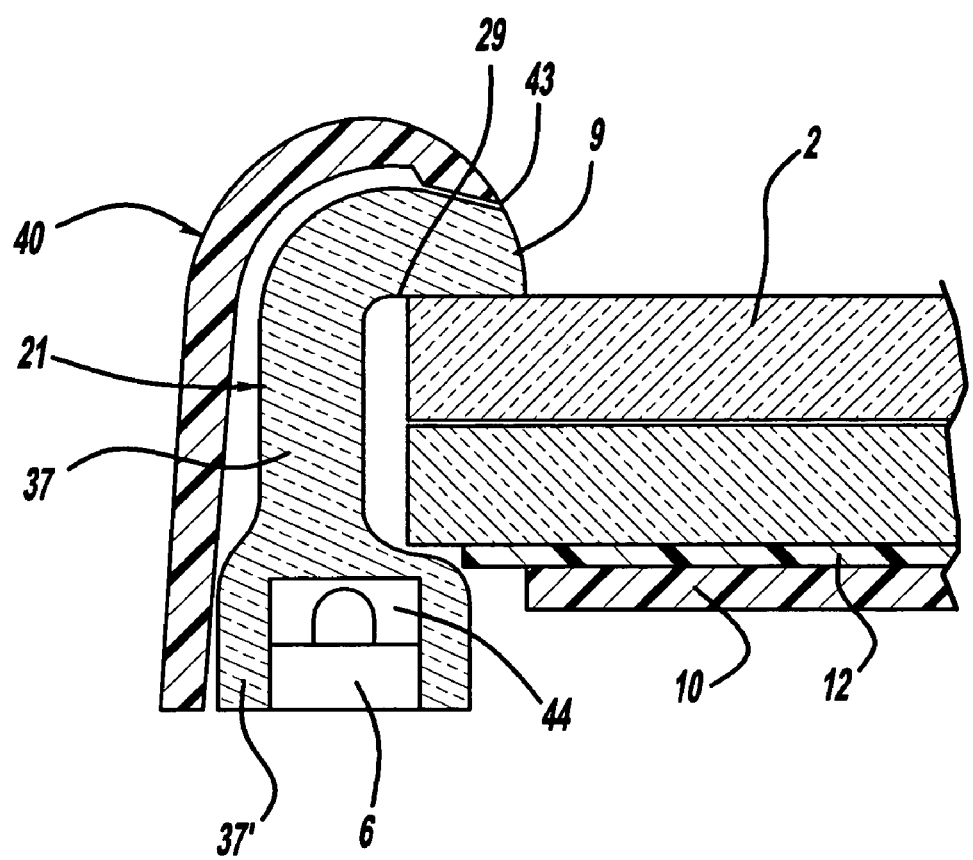
FIG. 10 shows a section along the line X-X in FIG. 9.

FIG. 9 shows an additional embodiment form in which the two built-in lights 5 are accommodated in an add-on component 40 that is placed in a corresponding recess (not shown) of the frame 3 and is attached to the frame and the mirror glass 2, for example by means of gluing or welding. The add-on piece 40 is integrated into the frame 3 so that it only protrudes from it by a negligible amount and also has a form that is adapted to the frame part in which it is provided. In the region of its inner edge 41, the add-on piece 40 has two semicircular recesses 42, 43 into which the ends or light exit surfaces 9 of the one leg 29 of the optical waveguide 21 of the two built-in lights 5 protrude. As in the embodiment form according to FIG. 4, the legs 29 rest against the mirror glass 2. The light exits approximately parallel to the surface of the mirror glass. The add-on piece 40 has an approximately L-shaped cross section and its upper free end 43 rests against the leg 29 of the optical waveguide 21. The upright, longer leg 37 widens out in the region below the mirror glass 2. Its widened end 37' has a recess 44 for the lamp 6, which can be constituted by an LED, an incandescent bulb, or the like. The mirror glass 2 is an EC mirror glass that is fastened to the mirror glass support 10 with the interposition of a heating foil 12. The edge of the mirror glass support 10 is recessed in relation to the edge 22 of the mirror glass 2. The heating foil 12 protrudes beyond the mirror glass support plate 10 and extends into the vicinity of the edge 22 of the mirror glass 2.

The mirror top and/or mirror bottom of the external rearview mirror 1 can contain additional elements such as a repeating turn signal, an area light, a camera, a GPS module, a washer unit for the mirror glass, a speaker, an antenna, a part of a garage door opener, or the like. These elements can be provided in any combination with one another in addition to the built-in lights 5.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An exterior rearview mirror of a motor vehicle, said exterior rearview mirror comprising:
    a mirror housing defining an opening and a frame having an upper frame part surrounding said opening;
    a mirror glass support movably secured within said mirror housing;
    a mirror glass fixedly secured to said mirror glass support in a position visible through said opening, said mirror glass defining a front surface, a back surface and a peripheral edge with said back surface fixedly secured to said mirror glass support;
    a light source disposed interior of said mirror housing between said mirror housing and said mirror glass to emit light radiation; and
    an optical wave guide defining a light exit surface substantially perpendicular to said mirror glass and in locking engagement with said upper frame part of said mirror housing for receiving said light radiation emitted by said light source and said optical wave guide transmitting said light radiation in a direction around said back surface and said peripheral edge and out toward said front reflective surface of said mirror glass such that said light radiation is reflected off said mirror glass and visible rearward of said exterior rearview mirror.

2. An exterior rearview mirror as set forth in claim 1 wherein said frame houses said light source.

3. An exterior rearview mirror as set forth in claim 2 wherein a portion of said frame protrudes inwardly over said mirror glass.

* * * * *